(12) United States Patent
Chimel et al.

(10) Patent No.: US 7,329,429 B2
(45) Date of Patent: Feb. 12, 2008

(54) BARS AND CONFECTIONERIES CONTAINING COCOA SOLIDS HAVING A HIGH COCOA POLYPHENOL CONTENT AND STEROL/STANOL ESTERS AND PROCESSES FOR THEIR PREPARATION

(76) Inventors: Mark J. Chimel, 6 Ashwood Trail, Long Valley, NJ (US) 07853; John F. Hammerstone, Jr., 526 Fulmer Rd., Nazareth, PA (US) 18064; J. Christopher Johnson, 539 American Dr., Yardley, PA (US) 19067; Mary E. Myers, 369 Harvest Dr., Lititz, PA (US) 17543; Rodney M. Snyder, 200 Foreman Rd., Elizabethtown, PA (US) 17022; Eric J. Whitacre, 570 Miller Rd., Elizabethtown, PA (US) 17022

( * ) Notice: Subject to any disclaimer, the term of this patent is extended or adjusted under 35 U.S.C. 154(b) by 627 days.

(21) Appl. No.: 10/672,232

(22) Filed: Sep. 25, 2003

(65) Prior Publication Data

US 2005/0069625 A1 Mar. 31, 2005

(51) Int. Cl.
*A23L 1/48* (2006.01)
(52) U.S. Cl. ...................... 426/631; 426/611
(58) Field of Classification Search ............... None
See application file for complete search history.

(56) References Cited

U.S. PATENT DOCUMENTS

| | | | |
|---|---|---|---|
| 6,194,020 B1 * | 2/2001 | Myers et al. ............... | 426/631 |
| 6,391,370 B1 | 5/2002 | Rogers et al. .............. | 426/611 |
| 6,399,137 B1 | 6/2002 | Dartey et al. ............... | 426/602 |
| 6,399,139 B2 * | 6/2002 | Myers et al. ............... | 426/631 |
| 6,423,363 B1 | 7/2002 | Traska et al. .............. | 426/604 |
| 6,441,206 B1 | 8/2002 | Mikkonen et al. .......... | 552/540 |
| 6,491,952 B1 | 12/2002 | Sjoberg ...................... | 424/488 |
| 6,599,553 B2 * | 7/2003 | Kealey et al. .............. | 426/593 |
| 6,610,320 B2 * | 8/2003 | Schmitz et al. ............. | 424/440 |
| 6,673,379 B2 * | 1/2004 | Kealey et al. .............. | 424/776 |
| 2002/0064584 A1 | 5/2002 | Kealey et al. .............. | 426/244 |
| 2002/0090438 A1 | 7/2002 | Mesu et al. .................. | 426/573 |
| 2002/0132035 A1 | 9/2002 | Tamarkin et al. ........... | 426/601 |
| 2002/0192318 A1 | 12/2002 | Berry et al. ................. | 424/776 |
| 2003/0068357 A1 | 4/2003 | Vala et al. ................... | 424/439 |
| 2003/0148007 A1 | 8/2003 | Schevers et al. ............ | 426/306 |
| 2006/0121174 A1* | 6/2006 | Franke ....................... | 426/611 |

FOREIGN PATENT DOCUMENTS

| | | |
|---|---|---|
| JP | 62-126966 A | 6/1987 |
| WO | WO 01/78529 | 10/2001 |
| WO | WO 02/055639 | 7/2002 |
| WO | WO 02/082929 | 10/2002 |
| WO | WO 02/100412 | 12/2002 |

OTHER PUBLICATIONS

Neil H.A.W., et al., Atherosclerosis 2001, 156, 329-337.
Penny M. Kris-Etherton et al. Am j. clin Nutr. 1994, 60, 1037S-42S.
Fabienne Nigon et al. Clin Chem Lab Med. 2001, 39(7), 634-640.
Chiaki Sanbongi et al. Cellular Immun. 1997, 177, 129-136.
HFJ Hendriks et al. European Journal of Clinical Nutrition 1999, 53, 319-327.
JA Weststrate and GW Meijer, European Journal of Clinical Nutrition 1998, 52 334-343.
Valentin Fuster, MD, Ph.D. et al., The New England Journal of Medicine 1992, 326, 310-318.
Norman K. Hollenberg et al, American Heart Association, Inc. 1997, 29, 171-176.
Law, M, Education and debate 2000; vol. 320, 861-864.
Matvienko, O et al., Am J. Clin. Nutr. 2002, 76; 57-64.
Maki Kevin C. et al., Am J. Clin Nutr. 2001, 74; 33-43.
Kondo, K. et al., Division of Clinical Nutr. National Institute of Health 1996 vol. 348; 1514.
Ikeda, I, et al., J. Nutr. Sci. Vitamino; 1981, 127; 243-251.
Hertog, M. et al., The Lancet 1993, 342; 1007-1011.
Hollenberg, N et al., American Heart Association, Inc. 1997, 171-176.
Vuorio, A et al., Arterioscler Thromb Vasc Biol. 1999, 500-506.
Ostlund, R., Jr., Annu. Re. Nutr. 2002, 22:533-549.
Ntanios Fady, Y. et al., Atherosclerosis 1998; 138; 101-110.
Bearden Monica, M., American Chemical Society 2000; Chapter 19; 177-186.
Pearson Debra A., et al., Thrombosis Research 2002; 106; 191-197.

(Continued)

Primary Examiner—Carolyn Paden (57) ABSTRACT

Processes are provided for preparing ready-to-eat health bars such as chocolate granola bars and chocolate confectioneries such as dark or milk chocolate chews. The bars and confectioneries contain sterol ester(s) and/or stanol esters and cocoa solids having a high cocoa procyanidin content. The cocoa solids are pretreated with the sterol/stanol ester(s) or other edible oils or fats during the preparation of the products to prevent the loss of cocoa procyanidins. Other particulate antioxidants can be pretreated with food grade fats and/or oils or emulsifiers such as lecithin to conserve their effectiveness.

22 Claims, 1 Drawing Sheet

OTHER PUBLICATIONS

R. D. Brumley MD, Amer. Med. Assoc. 2002, vol. 287; 2209-2213.
Chevaux Kati, A.M Journal of Food Composition and Analysis 2001, 14, 553-563.
Gylling Helena, Journal of Lipid Research 1995, vol. 36; 1807-1812.
Baker et al., Food and Chemical Toxicology (1999) 37: 13-22.
Karim, M. et al., Support to J. Nutri. 2000 130(8), 2105S-8S.
Mao, T.K. et al., Int. J. Immunotherapy 1999, XV(1): (15:23-29).
Ntanios et al., Atherosclerosis (1998) 138: 101-110.
Rein, D. et al., Suppt. to J. Nutri. 2000, 130(8):2109S-14S.
Rein, D. et al., Am. J. Clin. Nutr. 2000, 72(1):30-5.
Schramm, D.D. et al., Am. J. Clin. Nutr. 2001 73(1) 36-40.
Waalkens-Berendsen et al., Food and Chemical Toxicology (2002) 40:683-696.
Wan, Y. et al., Am. J. Clin. Nutri. 2001, 74(5):596-602.
Wang, J.F., Supp. to J. Nutr. 2000, 130(8), 2115S-9S.
Weststrate et al., Food and Chemical Toxicology (1999) 37: 1063-1071.
Wolfreys et al., Food and Chemical Toxicology (2002) 40:461-470.
Polagruto, et al., "Cocoa Flavanol-Enriched Sanck Bars Containing Phytosterols . . . " J. of the Amer. Dietetic Assoc. 2006 pp. 1804-1813.
Lees M. Ann et al., Plant Sterols as Cholesterol-Lowering Agents: Clinical Trails in Patients with Hypercholesterolemia and Studies of Sterol Balance, North-Holland Scientific Publishers, Ltd., vol. 28, 1977, pp. 325-338.
Mattson H. Fred et al., Optimizing the Effect of Plant Sterols on cholesterol Absorption in Man, The American Journal of Clinical Nutrition, vol. 35, 1982 pp. 697-700.
Mattson, H. Fred et al., Effect of Plant Sterol Esters on the Absorption of Dietary Cholesterol, The Procter & Gamble Company, Miami Valley Laboratories, J. Nutr. vol. 107, 1977, pp. 1139-1146.
EP Search Report for EP 04 25 5889, no date noted.

* cited by examiner

FIGURE 1

BARS AND CONFECTIONERIES CONTAINING COCOA SOLIDS HAVING A HIGH COCOA POLYPHENOL CONTENT AND STEROL/STANOL ESTERS AND PROCESSES FOR THEIR PREPARATION

BACKGROUND OF THE INVENTION

1. Field of the Invention

The inventions relates to foods, food supplements, and or nutriceuticals containing sterol and/or stanol esters and cocoa polyphenols and processes for producing same. The products prepared by the processes of this invention have conserved levels of polyphenols.

2. Background of the Invention

Polyphenolic compounds are bioactive substances that are derived from plant materials and are closely associated with the sensory and nutritional quality of products derived from these plant materials.

Many plant polyphenols have antioxidant activity and numerous health benefits. Consumption of the cocoa polyphenols in cocoa products provides significant health benefits. Cocoa polyphenols have been shown to have beneficial effects on the processes believed to be involved in the development of atherosclerosis and cardiovascular disease. Cocoa polyphenols inhibit LDL oxidation, enhance nitric oxide/nitric oxide synthase (NO/NOS) activity, and inhibit cyclo-oxygenase (COX) and lipoxygenase (LOX) activity. These effects are reported in WO 97/36497 published Oct. 9, 1997. Cocoa polyphenols can also be used to treat or prevent conditions which are known to be affected by the administration of non-steroidal anti-inflammatory drugs, for example, aspirin.

Despite the benefits of cocoa polyphenols on a number of pathways and conditions associated with induction and progression of atherosclerosis and coronary heart disease (CHD), it has been found that these compounds do not have a noticeable cholesterol-lowering effect. Thus, improved compositions containing polyphenols in combination with at least one cholesterol-lowering agent such as sterols and/or stanols or their esters have been prepared. The compositions have enhanced effects on the vascular health of a mammal, particularly a human, in comparison to previously known compositions containing polyphenols or cholesterol-lowering agents. See U.S. Pat. No. 6,610,320 issued Aug. 26, 2003 to H. H. Schmitz et al.

It is known that cocoa polphenols can be lost during the processing of cocoa ingredients containing cocoa polyphenols (e.g., cocoa solids, chocolate liquor, cocoa nibs, and cocoa extracts) into food products. Cocoa polyphenol losses can be avoided by pretreating the carbohydrate and/or the milk ingredient(s) used in food products with an antioxidant, an emulsifier, a fat, and/or a flavorant prior to the addition of the cocoa ingredient(s). See U.S. Pat. No. 6,194,020 issued Feb. 27, 2001 to M. E. Myers et al).

Foods and dietary supplements containing cocoa ingredients and cholesterol-lowering agents such as sterols and/or stanols or their have been prepared. See the '320 patent discussed above. The sterols/stanols or their esters may be added to the food or dietary supplement simply by mixing the sterol, stanol, and/or esters into the other ingredients. To facilitate mixing, the sterols/stanols may be first dissolved in a solubilizing agent such as a fat, a vegetable oil, a monoglyceride, diglyceride, or triglyceride, and/or tocopherols or suspended or emulsified in carriers such as water, alcohol polyol, or other edible compound in which the sterols/stanols or esters are at least partially soluble, for example chocolate liquor. During the preparation of a cholesterol-lowering dark chocolate, for example, the sterols/stanols may be added to the dry mix containing the sugar and the butter or less preferably they may be added to the melted chocolate. During the preparation of a toffee chew the sugar and the cocoa powder were pre-blended and then mixed with the caramel. Free phytosterols (as in pulverized) were added to the sugar and cocoa mix. During the preparation of granola bars the syrup blend was prepared by melting palm kernel oil at 45° and adding to the oil a mixture of corn syrup, glycerin, cocoa powder, brown sugar, salt, lecithin and propyl gallate and then blending in nuts or soy puffs and semi-sweet chocolate pieces.

SUMMARY OF THE INVENTION

Standard confectionery techniques for making bars and chews result in losses of flavanols and antioxidants compared to the known amounts added to the bars and chews.

Accordingly, it would be highly desirable to prepare food products and nutraceuticals containing sterol esters and/or stanol esters and cocoa polyphenols where the cocoa polyphenols are not lost during processing into the final product, i.e., products where the cocoa polyphenols present initially in the cocoa ingredients are conserved.

In the embodiments herein, reference to high CP cocoa solids and cocoa solids having a high cocoa procyanidin content is not intended to be limited to the polyphenols (i.e., procyanidins) present in the cocoa solids but is intended to cover other particulate food-grade antioxidants.

In one embodiment, a process is provided for conserving the effectiveness of a particulate, food grade antioxidant or an antioxidant-containing particles by pretreating the antioxidant or the antioxidant-containing particles, prior to formulation into a food or a food supplement, with about 9% to about 90% by weight of a food-grade oil and/or a fat having a melting point below about 80° C., preferably about 60° to about 80° C., and optionally with up to about 5% by weight an emulsifier, the weights being based on the weight of the antioxidant or the antioxidant-containing particles. Alternatively, the antioxidant or the antioxidant-containing particles can be pretreated with about 0.75% up to about 5% by weight, preferably about 0.05 to about 0.3%, more preferably about 0.1% to about 0.3% of a lecithin. The antioxidant or antioxidant-containing particles have particle sizes of about 1 to about 150 microns.

The antioxidants can be selected from the group consisting of lecithin, butylated hydroxyanisole, butylated hydroxytoluene, tertiary butylated hydroquinone, propyl gallate, a phenolic acid, a polyphenol, ascorbic acid, stannous chloride, a tocopherol, sulfur dioxide, dilauryl thiodipropionate, and mixtures thereof;

The oil and/or the fat is selected from the group consisting of cocoa butter, a polyol ester, a sterol ester, a stanol ester, a triglyceride, a fatty alcohol ester of a polycarboxylic acid, an esterified alkoxylated polyol, a glycerol ester, a vegetable oil, a partially hydrogenated vegetable oil, and mixtures thereof.

The optional emulsifiers for use with the fat and/or the oil are selected from the group consisting of lecithin, a mono- or diglyceride, an ethoxylated mono- or diglyceride, a phospholipid, an ester of a monoglyceride and acetic, lactic, citric, succinic, or tartaric acid, a fatty acid ester of a polyglycerol, a sorbitol ester, a sucrose ester, propylene glycol, polyglycerol polyresorcinoleate, and mixtures thereof. The preferred emulsifier is lecithin.

When the antioxidant-containing particles are a mixture of cocoa polyphenols present in fully defatted or partially defatted cocoa solids, the particles are preferably pretreated with about 20% to about 40% by weight of sterol ester(s) and/or stanol ester(s) and optionally up to about 20% of a chocolate liquor and/or with up to about 5% of a lecithin, preferably soy lecithin.

In a second embodiment, an additive for a food or a food supplement and a process for its preparation is provided. The additive comprises pretreated, partially or fully defatted cocoa solids having a high cocoa procyanidin (CP) content. The cocoa solids are pretreated by mixing with about 9% to about 90% by weight, based on the cocoa solids, of sterol ester(s) and/or stanol ester(s) which are liquids at temperatures of about 80° C. or less, preferably at about 60° C. to about 80° C. The cocoa solids after the pretreatment have a cocoa procyanidin content of at least about 50 to about 75 milligrams of a procyanidins, preferably about 60 to about 75 milligrams, and more preferably about 75 to about 80 milligrams per gram of defatted cocoa solids. Alternatively, the additive can comprise high CP, partially or fully defatted cocoa solids pretreated by mixing with up to about 5%, preferably about 0.05% to about 0.1%, and more preferably about 0.1% to about 0.3% by weight, based on the cocoa solids, of a lecithin.

In a third embodiment, a binder syrup and a process for its preparation are provided. The binder syrup comprises (i) a syrup and (ii) high CP cocoa solids pretreated with about 9 to about 90% by weight of a food-grade oil and/or a fat which is a liquid at 80° C. or less, preferably at about 60 to about 80° C., and optionally with up to about 5% by weight of a lecithin and/or up to about 20% of a chocolate liquor, preferably about 0.5% to about 10%, and more preferably about 0.5% to about 3% of the chocolate liquor. The binder syrup is liquid at about 60° C. to 80° C. and solid at room temperature.

It is prepared by mixing at about 20° C. to 160° C., preferably about 50° C. to about 120° C., more preferably about 80° C. to about 110° C., the syrup with pretreated cocoa solids. The high CP cocoa solids after the pretreatment have a cocoa procyanidin content of at least about 50 to 75, preferably 60 to 75, more preferably about 75 to 80 milligrams of cocoa procyanidins per gram of cocoa solids. Pretreatment of the high CP cocoa solids conserves at least about 65% to 100% of the cocoa procyanidin originally present in the cocoa solids.

In a fourth embodiment, a dry, ready-to-eat food and a process for its preparation is provided. The process comprises the steps of: (a) pretreating high CP cocoa solids with about 9% to 90% of sterol ester(s) and/or stanol ester(s) and optionally with up to about 20%, preferably about 1.5-10%, and more preferably about 0.5-3% of a chocolate liquor and/or up to about 5% of an emulsifier, the weights being based on the cocoa solids; (b) mixing the pretreated cocoa solids and a syrup with a mixture of dry ingredients comprising grain(s), flour(s), and/or protein(s) and optionally dried fruits and/or nuts to obtain a formable food; and (C) forming the food. The cocoa solids prior to the pretreatment have a cocoa procyanidin content of at least about 75 milligrams per gram of defatted cocoa solids. The pretreated cocoa solids and the syrup are liquid when blended into the dry ingredients and solid when the formed food is cooled to room temperature. Optionally, the food can be decorated or enrobed with a chocolate, a yogurt, or a flavored sugar. Preferably, when a granola bar is being prepared, the pretreated cocoa solids and the syrup are premixed at about 60° C. to about 80° C. to form a binder syrup prior to blending with the dry ingredients. The preferred cocoa solids are partially defatted cocoa solids containing about 8 to about 30% fat and having a cocoa procyanidin content of at least about 50 to about 150 milligrams, preferably about 50 to about 80 milligrams. The preferred sterol ester(s) are prepared from rapeseed oil and comprise β-sitosterol, campesterol, and stigmasterol. The emulsifier can be selected from the group discussed above; the preferred emulsifier is lecithin. The preferred syrup is a corn syrup having a DE of about 40 to about 65. The syrup optionally comprises a whole milk powder, a skim milk powder, and/or a malted milk powder, a flavorant, one or more vitamins and/or minerals, a sugar such as brown sugar andlor fructose, and/or a salt. The dry ingredients used for the granola bar include grains such as rice crisps, soy crisps, and/or oats. Other useful dry ingredients are flours such as bran, corn, wheat, and/or rice flour and proteins such as a milk protein, an egg protein, a soy protein and/or whey. A dry, ready to eat chocolate granola bar optionally containing almonds, dried cherries, or blueberries can be prepared by this process. The bar contains at least about 2, preferably about 2 to about 25, more preferably about 2.5 to about 10, and most preferably about 3 to about 7 milligrams of cocoa procyanidins per gram of the bar which is at least about 65%, typically about 90 to 100%. of the cocoa procyanidin originally present in the cocoa solids used to prepare the bar. The bar also contains about 4 to about 200, preferably about 40 to about 65 milligrams of sterol ester(s) and/or stanol ester(s) per gram of the bar.

In a fifth embodiment, a chocolate confectionery such as dark chocolate or milk chocolate chew and a process for their preparation are provided. The process comprises (a) pretreating cocoa solids having a cocoa procyanidin content of at least about 5 milligrams per gram of defatted cocoa solids with about 9 to about 90% of sterol ester(s) and/or stanol ester(s) and with up to about 20%, preferably about 0.5% to about 10%, and most preferably about 0.5% to about 3% of chocolate liquor and/or with up to about 5%, preferably about 0.5% to about 5% of an emulsifier; (b) blending the pretreated cocoa solids with a syrup at about 20° C. to about 160° C.; (c) cooling the blend to about 5° C. to about 60° C., preferably about 15° C. to 40° C., and more preferably 20° C. to about 30° C. and (d) shaping the cooled blend into the confectionery. The preferred cocoa solids have a fat content of about 8% to about 30%, more preferably 10-12% and a cocoa procyanidin content of about 50 to about 150 milligrams. The preferred sterol esters are prepared from rapeseed oil and comprise esters of β-sitoserol, campesterol, and stigmasterol. The emulsifiers discussed above can be used; the preferred emulsifier is lecithin. When chocolate liquor and/or lecithin are used, they are preferably premixed with the sterol ester(s) and/or stanol ester(s) before addition to the cocoa solids. The syrup is an aqueous solution of a nutritional carbohydrate sweetener or artificial sweetener. The syrup has a moisture content of about 1% to about 15%. The syrup may further comprise a gum, vitamin (s) and/or mineral(s), a sugar such as brown sugar and/or fructose, and/or a flavorant. The preferred is one or more corn syrups having a DE of about 40 to about 65. The dark or milk chocolate chews thus prepared contain at least about 2, preferably about 2 to about 25, more preferably about 2.5 to about 10, and most preferably about 3 to about 7 milligrams of cocoa procyanidins per gram of chew and about 4 to about 200 milligrams, or typically about 40 to about 65 milligrams of sterol esters per gram of the chew. The chews contain about 65 to 100%, typically about 90-100%, of the cocoa procyanidins originally present in the cocoa solids.

The pretreated high CP cocoa powders of the present invention are useful in foods and food supplements other than those exemplified herein. For example, they are useful in the preparation of chocolate confectioneries including SOI and non-SOI chocolates particularly semi-sweet and dark chocolates, cookies including brownies, cakes, chocolate coatings, toffees, caramels, hard candies, and the like.

Chocolate snacks prepared by the above processes improve or promote vascular heart health in a mammal. These ready-to-eat snacks contain flavanols, specifically cocoa procyanidins, that promote healthy circulation and healthy blood vessels. They contain heart healthy vitamins such as B6, B12, and folic acid as well as antioxidant vitamins E and C and/or calcium. In addition, they contain plant sterol and/or stanol esters that are proven to reduce bad cholesterol (LDL) by up to about 15%. For maximum benefit, the snacks should be used as part of a diet that is low in saturated fat and cholesterol.

Figure 1:
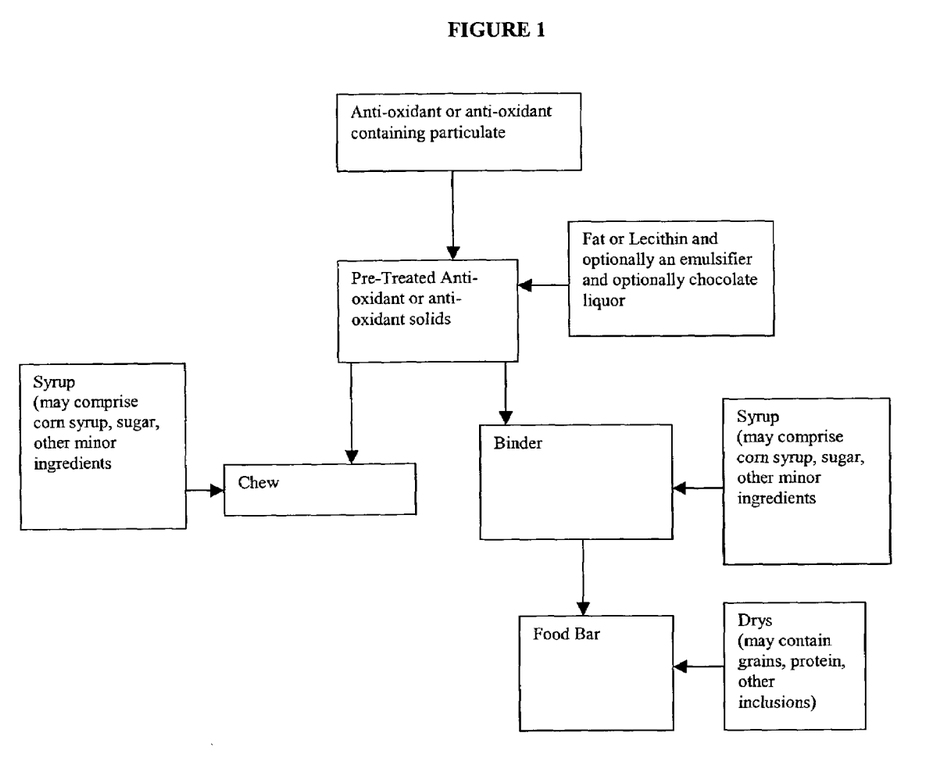
The figure is a flow chart showing the preparation of a chew from a pretreated antioxidant or antioxidant-containing particle and a syrup and the preparation of a food bar from a pretreated antioxidant or antioxidant-containing particle, and a syrup, and dry ingredients. In the preparation of the bar the pretreated antioxidant and the syrup are combined to form a binder which is added to the dry ingredients. The optional ingredients for inclusion in the pretreated antioxidant or antioxidant particles, the syrup, and the dry ingredients are shown.

A further advantage of the pretreatment process, in addition to conservation of cocoa procyanidins, is that it permits the preparation of two heated liquid streams which in the preferred embodiment for making granola bars are blended at the last possible moment. Both the pretreated cocoa solids and the syrup streams are much lower in viscosity than their combination. This facilitates using conventional tanks, lines, and positive-displacement pumps, as well as keeping the pressure drop in the piping within reasonable limits. The two heated liquid streams can be blended in-line, provided they are delivered in the desired proportions. Suitable equipment for in-line mixing is readily available, and due to its compact size, can be located in proximity to the point of use where the binder syrup (i.e., combined streams) is combined with the dry ingredients (grains, dried fruits and nuts and the like) to make confectionery products.

DETAILED DESCRIPTION OF THE INVENTION

As used herein, the term "antioxidant" refers to compounds that prevent oxidation and function as a reducing agent or as an electron donor/receptor. According to their mode of action, antioxidants may be classified as free radical terminators, metal ion chelators, or as scavengers that react with oxygen. Suitable antioxidants classes include tannins, including condensed tannins and hydrolyzable tannins, quinones, polyhydroxy compounds, phospholipids, tocol compounds or derivatives thereof. Exemplary antioxidants include, but are not limited to, butylated hydroxyanisole, butylated hydroxytoluene, tertiary butylated hydroquinone, propyl gallate, a phenolic acid, a polyphenol, ascorbic acid, stannous chloride, a tocopherol, sulfur dioxide, and dilauryl thiodipropionate. The antioxidants and antioxidant-containing particles have particle sizes of up to about 150 microns, typically about 5 to about 70 microns.

As used herein, "food" is a material consisting of protein, carbohydrate and/or fat, which is used in the body of any organism to sustain growth, repair vital processes, and to furnish energy. Foods may also contain supplementary substances, such as minerals, vitamins, and condiments (Merriam-Webster Collegiate Dictionary, $10^{th}$ Edition, 1993).

As used herein, "food supplement" is a product (other than tobacco) that is intended to supplement the diet that bears or contains one or more of the following dietary ingredients; a vitamin, a mineral, an herb or other botanical, an amino acid, a dietary substance for use by man to supplement the diet by increasing the total daily intake, or a concentrate, metabolite, constituent, extract or combination of these ingredients. (Merriam-Webster Collegiate Dictionary, $10^{th}$ Edition, 1993). When the term is used on food labels, "supplement" means that nutrients have been added in amounts greater than 50% above the U.S. Recommended Daily Allowance ("Understanding Normal and Clinical Nutrition", $3^{rd}$ Edition, Editors Whitney, Catalado and Rolfes at page 525).

The present invention relates to products such as foods or food supplements, other than beverages or beverage mixes, which contain antioxidants, preferably cocoa polyphenols, in combination with selected sterol ester(s) and/or stanol ester(s). The products may optionally contain L-arginine, minerals such as calcium, potassium and magnesium, vitamins such as B, C, and E, a carotenoid, and mono- or polyunsaturated fatty acids (e.g., an omega-3 fatty acid). Products containing polyphenols from sources other than cocoa which have antioxidant properties similar to those of cocoa polyphenols (for example, nuts, nut flours, and nut skins) may also be used in combination with the cocoa polyphenols. Cholesterol-lowering agents other than sterol/stanol esters may be used herein in combination with the sterol ester(s) and/or stanol ester(s). Examples include low caloric and non-caloric fats.

As used herein, the term "cocoa polyphenols" refers to polyphenolic compounds including proanthocyanidins, more particularly procyanidins, present in cocoa beans, cocoa nibs, cocoa ingredients prepared from cocoa beans or nibs, and cocoa extracts prepared from cocoa beans or cocoa ingredients. The term "procyanidin" refers to naturally occurring or synthetically derived oligomers of catechin and/or epicatechin; however, any reference to "cocoa procyanidins" herein should be understood to also include the monomers catechin and epicatechin. The monomers include (+)-catechin, (−)-epicatechin and their respective epimers (e.g. (−)-catechin and (+)-epicatechin). The monomers have the structure:

Procyanidin oligomers may have from 2 to about 18 monomeric units. The oligomers include, for example, dimers, trimers, tetramers, pentamers, hexamers, heptamers, octamers, nonamers, decamers, etc. In the natural oligomer, the monomers are connected via (4→6) and/or (4→8) interflavan linkages. Oligomers with exclusively (4→8) linkages are linear. The presence of at least one (4→6) linkage results in a branched oligomer. For the synthesis of 4→8 procyanidins, see U.S. Pat. No. 6,420,572 issued Jul. 16, 2002 to L. J. Romanczyk, Jr. et al., the disclosure of which is incorporated herein by reference, The '572 patent discloses coupling hydroxy-protected phenolic monomers (e.g., epicatechin or catechin) having a C-4 activating group (e.g., a $C_2$-$C_6$ alkoxy group having a termimal hydroxy group such as hydroxyethoxy) with a second protected phenolic monomer to prepare protected dimers which are then deprotected or optionally coupled with other protected, activated phenolic monomers.

Cocoa polyphenol derivatives may also be useful. These include gallated catechin and/or epicatechin monomers and oligomers, glycosylated monomers and oligomers, and mixtures thereof; metabolites of the procyanidin monomers and oligomers such as sulfated, glucoronidated, and methylated forms; and enzyme cleavage products of procyanidins generated by colonic microflora metabolism or internal mammalian metabolism. The derivatives may be from natural sources or prepared synthetically.

Synthetic oligomers are also useful herein. See U.S. Pat. No. 6,156,912 issued Dec. 5, 2000 to W. Tückmantel et al. and U.S. Pat. No. 6,476,241 issued Nov. 5, 2002 to A. Kozikowski et al.

The term "fair average quality cocoa beans" refers to cocoa beans that have been separated from the pulp material and dried and are relatively free of mold and infestation. Such beans are a commercial commodity and form the feedstock for preparing high CP cocoa solids. The term includes any such bean that has been genetically modified or produced.

The term "raw freshly harvested cocoa beans" refers to seeds or beans freshly harvested from the cocoa pod and which have not been subjected to processing other than separation from the pulp. The term includes any such bean that has been genetically modified or produced.

As used herein, the term "cocoa solids" refers to partially or fully defatted cocoa solids (e.g., cake or powder) prepared directly by screw pressing shelled cocoa beans into cocoa butter and partially defatted cocoa solids or by milling roasted cocoa beans into chocolate liquor and pressing the chocolate liquor to recover cocoa butter and partially defatted cocoa solids.

As used herein, the term "high CP cocoa solids" refers to cocoa solids in which the cocoa procyanidin content is conserved during the preparation of the cocoa solids and/or to cocoa solids prepared from unfermented, underfermented, or fair to average quality (FAQ) cocoa beans.

Cocoa beans from any species of *Theobroma, Herrania* or inter- and intra-species crosses thereof may be used to prepare cocoa solids and chocolate liquor for use herein. Preferably, the cocoa solids are prepared from unfermented and/or underfermented cocoa beans, i.e., slaty cocoa beans, purple cocoa beans, mixtures of slaty and purple cocoa beans, mixtures of purple and brown cocoa beans, or mixtures of slaty, purple, and brown cocoa beans. More preferably, the cocoa beans are slaty and/or purple cocoa beans have a higher cocoa polyphenol content than fermented beans. The chocolate liquor is preferably prepared from roasted, fermented cocoa beans because the flavor/aroma of the roasted, fermented cocoa beans is better.

The cocoa polyphenol content of cocoa ingredients is higher when the cocoa beans or blends thereof have a fermentation factor of 275 or less. Preferably, these cocoa beans are used for processing into high CP cocoa solids. The "fermentation factor" is determined using an industry-recognized grading system. To assess the degree of fermentation, cocoa beans are typically subjected to a standard cut test for assessing quality as defined by standards.

A method for preparing cocoa solids having a high cocoa polyphenol content directly from cocoa beans is disclosed in U.S. Pat. No. 6,015,913 issued Jan. 18, 2000 to Kirk S. Kealey et al., the disclosure of which is incorporated herein by reference. In the process of the '913 patent, the cocoa beans are heated for a time and at an internal bean temperature sufficient to loosen cocoa shell without roasting the cocoa nib (e.g., infra-red heating to about 100° C. to about 110° C.). The cocoa nibs are winnowed from the cocoa shells. The cocoa nibs are screw pressed into the cocoa butter and the partially defatted cocoa solids. The cocoa solids contain cocoa polyphenols including cocoa procyanidins from the cocoa nibs. Much higher levels of the higher procyanidin oligomers are present in the cocoa solids thus produced then are present in cocoa solids prepared by a traditional roasting process. The total cocoa procyanidin amounts in the cocoa solids are determined as described hereafter. The method for determining the internal bean temperature (IBT) is described in the '913 patent.

A method for preparing cocoa solids or chocolate liquor from roasted unfermented, underfermented, or fair to average quality cocoa beans is disclosed in U.S. Pat. No. 6,312,753 issued Nov. 6, 2001 to Kirk S. Kealey et al., the disclosure of which is incorporated herein by reference. Cocoa beans or nibs having a fermentation factor of 275 or less. The beans are passed through an infra-red heater, and winnowed to separate the shell (hull), roasted to an internal bean temperature of about 95° C. to about 150° C., and milled into a course chocolate liquor from which the cocoa butter and partially defatted cocoa solids are pressed.

The chocolate liquor may also be prepared from cocoa beans that have been processed using traditional cocoa processing methods (described, for example, in Industrial Chocolate Manufacture and Use, ed. Beckett, S. T., Blackie Acad. & Professional, New York, 1997, such as in Chapters 1, 5 and 6) or using the improved processing method described in the '913 patent discussed above.

If desired, a cocoa extract can be included in the products herein. The preparation of cocoa extracts from cocoa beans is disclosed in U.S. Pat. No. 5,554,645 issued Sep. 10, 1996 to Leo J. Romanczyk, Jr. et al., the disclosure of which is incorporated herein by reference. In the process of the '645 patent cocoa beans including the pulp are freeze dried, the freeze dried mass is depulped, the freeze dried cocoa beans are dehulled and ground, and the resulting cocoa mass is defatted and then solvent extracted, for example with aqueous methanol, aqueous acetone, or ethyl acetate. Extracts can also be prepared from high CP cocoa solids prepared by the processes described in the '913 and '753 patents previously discussed. Improved processes for preparing cocoa extracts enriched in certain oligomers, as well as decaffeinated and detheobrominated cocoa extracts, are described in U.S. Ser. No. 09/590,931 filed Jun. 9, 2000, now allowed, the disclosure of which is incorporated herein by reference.

Pretreated Cocoa Antioxidant Mixture

This mixture, also referred to as the fat phase, contains no added moisture.

Fats and/or Oils

Antioxidants or antioxidant-containing particles, such as high CP cocoa solids are pretreated with a food-grade fat or oil to protect the particles during further processing into a food, a food supplement, or a food additive. Pretreatment by mixing with the fat or oil prevents the loss of cocoa procyanidins. The antioxidants or antioxidant-containing particles are mixed with about 9 to about 90%, typically about 15-80%, preferably about 25-70%, more preferably about 40-60% of the fat and/or oil. If not liquid at room temperature, the fats should be liquifiable at about 70°-80° C., preferably at about 60° C.

Preferred antioxidants, including the preferred cocoa solids, are discussed above. Preferred fats and oils include sterol ester(s) and/or stanol ester(s) and vegetable oils such as corn, soya, cocoa butter and cocoa oil, coconut oil, and palm kernel oil. The most preferred are sterol ester(s) and/or stanol esters which are added as a cholesterol-lowering agent as well as as a pretreatment ingredient for protecting the antioxidant and high CP cocoa solids.

Phytosterols are plant sterols that do not dissolve in water and have a molecular weight and structure similar to cholesterol. Over forty plant sterols have been identified but beta-sitosterol, campesterol and stigmasterol are the most abundant. Other examples of useful sterols are brassicasterol, desmosterol, chalinosterol, poriferasterol, and clionasterol.

Stanols are saturated derivatives of sterols in which all carbon-carbon bonds in the rings are saturated. Stanols typically have 28 or 29 carbon atoms and include beta-sitostanol, clionastanol, 22,23-dyhydrobrassicastanol and campestenol. Stanols are found in small amounts in nature but may be easily prepared from sterols by hydrogenating sterols by any of the several methods known to those skilled in the art. When a sterol starting material is prepared from a plant material it will contain a mixture of several different sterols thus, after hydrogenation, the resulting stanol will also be a mixture of different stanols.

Cocoa oil extracted from cocoa hulls is also a good source of phytosterols. Cocoa phytosterols are a mixture of free and bound sterols, with the free sterols being up to about 90% of the phytosterols present. The phytosterols include campesterol, β-sitosterol, stigmasterol, cycloartenoyl, 24-methylene cycloartenoyl, as well as minor amounts of other phytosterols. The bound phytosterols include the fatty acid esters or ferulate derivatives of the phytosterols.

Esterified forms of sterols and stanols are the forms used herein. Esterification renders the sterols/stanols more soluble in fats and oils. For example, sterols may be esterified with fatty acid esters such as rapeseed oil, canola oil, and like oils. Suitable fatty acids include saturated or unsaturated fatty acids typically having 14 to 24 carbon atoms. Examples of esterified sterols include sitosterol acetate, sitosterol oleate and stigmasterol oleate. Stanol esters may be prepared as is known in the art and, as for example, described in U.S. Pat. No. 6,174,560 issued Jan. 16, 2001 to Miettenen et al. and assigned to Raisio Benecol Ltd.; U.S. Pat. No. 6,031,118 issued Feb. 29, 2000 to van Amerongen et al. and assigned to Lipton; U.S. Pat. No. 5,958,913 issued Sep. 28, 1999 to Miettenen et al. and assigned to Raisio Benecol; U.S. Pat. No. 5,892,068 issued Apr. 6, 1999 to Higgins, III and assigned to McNeil PPC, Inc.; and U.S. Pat. No. 5,502,045 issued Mar. 26, 1996 to Miettenen et al. and assigned to Raisio Benecol, Ltd., the disclosures of which are incorporated herein by reference. The '045 patent describes the interesterification of free stanols with a methyl ester mixture of $C_2$ to $C_{22}$ fatty acids (e.g., rapeseed oil) using an interesterification catalyst such as sodium ethylate. An interesterification process such as that disclosed in the '045 patent can also be used to esterify sterol esters. In another embodiment, useful stanol esters are prepared by esterifying at least one sterol with a $C_2$ to $C_{22}$ fatty acid ester as described in the '913 patent cited above.

Particularly useful herein are canola oil sterol esters, sunflower oil sterol esters, and their mixtures. These sterol ester mixtures melt at around 30°-50° C.; however, typically the esters are heated to about 60°-80° C. to ensure the entire mixture is liquified. The liquid or liquefied sterols/stanol esters are mixed with the high CP cocoa solids to protect the CPs during the further processing of the cocoa solids into the final products prevents this loss about. When not pretreated, up to about 40% to about 90% of the cocoa procyanidins can be lost during processing of the cocoa solids into the final product, depending on processing conditions such as temperature and shear. It is believed that the CPs are moisture-sensitive and that pretreatment with sterol and/or stanol esters prior to contact with the aqueous syrup used in the preparation of the products protects the CPs. When the processes described herein are followed, at least 65% of the cocoa procyanidins are conserved. Typically, about 80% to about 90% of the cocoa procyanidins are conserved. More preferably, about 90% to 100% are preserved.

Emulsifier(s)

Preferably, an emulsifier such as lecithin, a mono- or diglyceride, mono- or diglyceride, a phospholipid, an ester of a monoglyceride and acetic, lactic, citric, succinic, or tartaric acid, a fatty acid ester of a polyglycerol, sorbitol esters, sucrose esters, propylene glycol, or polyglycerol polyresorcinoleate is also premixed with the sterol and/or stanol esters and chocolate liquor before addition to the cocoa solids. The emulsifier is used in amounts of about 0.05% to about 5%, preferably about 0.05% to about 1%, more preferably about 0.05% to about 0.25%. Emulsifying agents are well known to play a critical role in suspension rheology and are used throughout food manufacturing, especially confectionery and chocolate manufacturing, to enhance the rheology (i.e., reduce viscosity and/or yield value) of solids suspensions.

Lecithin derived from vegetable oils, e.g., soybean, cottonseed, corn, safflower, and rapeseed oil, including clarified lecithins, fluidized lecithins, compounded lecithins, hydroxylated lecithins, deoiled lecithins, and fractionated lecithins are useful herein. Soy lecithin is the preferred emulsifier for use herein. It is one of the oldest and most widely used emulsifying agents. In chocolate, lecithin demonstrates a significant viscosity lowering effect. It can be used in amounts of up to about 5%, preferably about 0.05% to about 0.3%, more preferably about 0.1% to about 0.3% by weight, based on the finished chocolate.

When a reduced fat food is prepared, a combination of emulsifying agents is used, i.e., a base emulsifying agent and a second emulsifying agent. The base emulsifying agent is added in an amount of less than 1.0% by weight. The amount of the base emulsifying agent present in the reduced-fat chocolates is about 0.1% to about 0.9%, preferably about 0.2% to about 0.8%, and more preferably about 0.4% to about 0.6% by weight, based on the total weight of the chocolate. Selected combinations of emulsifying agents have been identified for use in reduced-fat confectioneries, having improved rheology. Emulsifying agent combinations that are particularly useful are combinations of lecithin, sucrose polyerucate, sucrose polystearate, ammonium phosphatide, phosphated mono-di-glycerides/diacetyl tartaric acid of mono-glycerides, or fractionated lecithin, with sucrose polyerucate and/or polyglycerol polyricinoleate. The rheology of reduced-fat chocolates may be further improved using a three component emulsifier combination. The preferred combinations include lecithin-sucrose polyerucate, lecithin-polyglycerol polyricinoleate, sucrose polyerucate-polyglycerol polyricinoleate, and lecithin-sucrose polyerucate-polyglycerol polyricinoleate.

Chocolate Liquor

Preferably chocolate liquors such as those discussed above are included with the pretreated cocoa solids in amounts of up to 20%, typically about 0.5% to about 10%, and more preferably about 0.5% to about 3%. Of course, the amount of cocoa solids and chocolate liquor used will depend upon the type of product being prepared.

Syrup

The syrup comprises an aqueous solution of nutritive carbohydrate sweetener(s) and/or sugar substitute(s).

Nutritive carbohydrate sweeteners, with varying degrees of sweetness intensity are useful herein. Preferably, the sweetener comprises a corn syrup or a blend of corn syrups and another sweetener. Suitable sweeteners include those typically used in foods and include, but are not limited to, sucrose (e.g., from cane or beet), dextrose, fructose, lactose, maltose, glucose syrup or the solids thereof, corn syrup or the solids thereof, invert sugar, hydrolyzed lactose, honey, maple sugar, brown sugar, molasses and the like.

Sugar substitutes may be used to partially replace the sweetener in the syrup, particularly in the production of reduced-calorie products. The term "sugar substitute" includes high potency sweeteners, sugar alcohols (polyols) and bulking agents, or combinations thereof. The high potency sweeteners include aspartame, cyclamates, saccharin, acesulfame, neo-hesperidin dihydrochalcone, sucralose, alitame, stevia sweeteners, glycyrrhizin, thaumatin, and the like, and mixtures thereof. The preferred high potency sweeteners include aspartame, cyclamates, saccharin, and acesulfame-K. Examples of sugar alcohols may be any of those typically used in the art and include sorbitol, mannitol, xylitol, maltitol, isomalt, lactitol and the like. The food products of the present invention may also contain bulking agents, typically used in combination with high potency sweeteners. The term "bulking agents" as defined herein may be any of those typically used in the art and include polydextrose, cellulose and its derivatives, maltodextrin, gum arabic, and the like.

Typically, the syrup comprise about 5% to 100% of corn syrup solids and up to 80% sugar, based on the total weight of the syrup. For the food bars, the corn syrup is about 5% to 100%, preferably about 65% to about 98%, and most preferably about 80% to about 95% and the sugar is up to about 20%, preferably about 1% to about 10%, and more preferably about 1% to about 5%. For a chocolate confectionery such as a chew, the corn syrup is about 5% to about 80%, preferably about 10% to about 50%, and most preferably about 20% to about 35%.

Minor amounts of other water-soluble or water-dispersible ingredient are also included in the syrup, for example up to 15% of vitamins and/or minerals, up to 1% of a flavorant, and up to 3% of a salt.

As used herein, the term "flavoring agent" refers to flavored compounds or compositions used in food or food supplement to impart a desired taste and/or aroma. Exemplary flavoring agents suitable for use herein include vanillin, raspberry spices, and naturally expressed citrus or spice oils.

Binder Syrup

The binder syrup comprises the syrup and the pretreated solids (e.g., a particulate antioxidant or antioxidant-containing particles such as cocoa solids is formulated to first coat the dry ingredient and then "set" or harden to hold the final product in the desired shape. The binder syrup can also carry other water-soluble or water-dispersible ingredients such as flavorants. Typically, a sugar-based syrup that hardens when cooled is used. In ready-to-eat snack foods. The binder syrups contain about 50% to about 85%, preferably about 60% to about 80%, and more preferably about 65% to about 80% by weight, and most preferably about 70% to about 75% of the syrup and about 15% to about 50%, preferably about 20% to about 40%, more preferably about 25% to about 40% and most preferably about 25% to about 30% by weight of pretreated solids. The percentages are by weight and total 100%. The moisture content of the binder syrup is about 1% to about 15%, preferably about 3% to about 12%, and most preferably about 5 to about 10%.

Dry Ingredients

Any suitable grain, flour, and/or protein can be used in the ready-to-eat food bars. Typical grains include flaked oats, wheat, barley, and rye, toasted rolled oats, crisped rice and the like. Typical flours include bran, corn, wheat, and rice. Typical proteins include soy, whey, milk, peanut, and egg proteins. Optional dry ingredients include chopped or whole nuts, such as almonds, hazelnuts, peanuts, and coconut flakes, dried fruits such as blueberries and cherries, and chocolate chips. The binder syrup comprises about 30% to about 75% preferably about 40% to about 65%, more preferably about 50% to about 60%, and most preferably 55% by weight of the bar. Preferably, the granola bar with or without fruit and/or nut inclusions is enrobed or decorated with chocolate, preferably a tempered dark chocolate, yogurt, or flavored granulated sugars.

If desired, the granola bar can contain supplemental dietary fiber(s) which are added in the form of compressed flakes. As used herein, the term "supplemental dietary fiber" refers to dietary fibers which are added to the bar apart from the fiber which is typically included in a granola bar. The supplementary dietary fibers can be of various types and preferably are a mixture of various types and, more preferably, a mixture of soluble and insoluble dietary fibers. Sources generally known to contribute insoluble fiber include, but are not limited to, soy fiber, apple fiber, corn bran, wheat bran, oat bran, barley bran, rye bran, triticale bran, cellulose, pea fiber, sugar beet fiber, and peanut fiber. Sources generally known to contribute soluble fiber include, but are not limited to, gum arabic, gum ghatti, guar gum, pectins, psyllium, carrageenans, xathan, tragocanth, karaya, locust bean gum, agar, and alginates.

Ready-To-Eat Products

The food products prepared herein have a reduced water availability to prevent microbial growth and lengthen shelf life. Such availability of water in a food is commonly termed "water activity" (A). In general, a low A food product (under 0.90) indicates the existence of an environment in which most bacteria will not generally grow, and 0.1-0.55 is preferred.

The term "chocolate" is intended to refer to all chocolate or chocolate-like compositions with a temperable fat phase. As the invention is directed to the control of the characteristics of the fat or fat-like phase of the chocolate, rather than the non-fat materials within the chocolate, the term is intended to include all chocolate and chocolate-like compositions that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates and chocolate-like compositions, unless specifically identified otherwise.

Reduced fat chocolates comprise a fat, solid containing chocolate ingredients, and a combination of a base emulsifying agent and at least one other emulsifying agent. The chocolates are prepared by mixing the fat and chocolate ingredients, adding the base emulsifying agent to the mixture; and then adding at least one other emulsifying agent. The resulting confectioneries have the texture of a full-fat confectionery.

Chocolate may take the form of solid pieces of chocolate, such as bars or novelty shapes, and may also be incorporated as an ingredient of other, more complex confections where chocolate is combined with and generally coats other foods such as caramel, peanut butter, nougat, fruit pieces, nuts, wafers, ice cream or the like. These foods are characterized as microbiologically shelf-stable at about 65° to about 85° F. (18° to 29° C.), under normal atmospheric conditions.

The syrup is about 50% to about 85%, preferably about 60% to about 80%, more preferably about 65% to about 80%, and most preferably about 70% to about 75% of the chew. The cocoa solids are about 15% to about 50%, preferably about 20% to about 40%, more preferably about 25% to about 30% of the chews. The percentages are by weight and total 100%. The moisture content of the syrup is about 1% to about 15%, preferably about 3% to abut 12%, and most preferably about 5% to about 10%.

When chocolate chews are prepared, the pretreated cocoa solids and the syrup are combined at a temperature of about 20° C. to about 160° C., preferably about 50° C. to about 120° C., more preferably about 80° C. to about 110° C. and then cooled to about 5° C. to about 60° C., preferably about 15° C. to about 40° C., and more preferably about 20° C. to about 30° C. and then shaped.

When granola bars are prepared, preferably the pretreated cocoa solids and syrup are combined immediately before addition to the solids ingredients and the resulting binder syrup is then added to the dry ingredients. The combining and cooling temperatures discussed above are suitable for the bars.

Test Methods

Determination of Cocoa Procyanidin Content

The cocoa procyanidin content of the cocoa solids, binder syrup, chocolate foods (e.g., granola bars), and chocolate confectioneries (e.g., dark or milk chocolate chews) was determined by normal phase high performance chromatography (HPLC) on silica with fluorescent detection. The details of this approach are covered in Adamson, G. E., Lazarus, S. A., Mitchell, A. E., Prior, RL. Gao, 0., Jacobs, P. H., Kremers B. G., Hammerstone, J. F., Rucker P., Ritter, K. A., Schmitz, H. H., *HPLC Method for the Quantification of Procyanidins in Cocoa and Chocolate Samples and Correlation to Total Antioxidant Capacity, J. Ag. Food Chem.;* 1999; 47 (10) 4184-4188. Cocoa Solids were defatted with hexane prior to extraction of the procyanidins. Binder syrup and the chocolate products (e.g., chocolate chews and chocolate granola bars) were cyro-ground to a fine powder and immediately extracted with 70% acetone, 29.5% water, and 0.5% acetic acid. The binder syrup and finished products were not defatted prior to procyanidin extraction. Cocoa procyanidin quantitation was achieved through the use of a well characterized composite reference standard material. Samples were then compared with the composite standard to accurately determine the levels of procyanidins.

Determination of Methylxanthines in Cocoa Solids

The theobromine and caffeine content of cocoa solids prepared from various cocoa beans was determined using the procedure described below. The solids are typically defatted first by extraction with hexane.

The theobromine and caffeine contents were analyzed according to § 35 LMBG "Amtliche Sammlung von Untersuchungsverfahren" L-18.00-16 Bestimmung von Theobromin und Coffein in feinen Backwaren" *Cocoa Atlas* 2002, *Methodology*—p. 17, 2002 Foundation of the German Cocoa and Chocolate Industry and Prof. Dr. R. Lieberei, Dipl.-Biol. C. Rohsius. The determination of theobromine and caffeine was carried out by means of the RP-HPLC with UV-detection.

A total of 0.500 g defatted, milled cocoa powder was mixed with 160 ml. boiling distilled water in a 200 ml graduated flask and put in a boiling water bath for 30 min. being occasionally stirred. Subsequently, the sample was cooled down to 20° C. purified by 1 ml Carrez 1 ($K_4[Fe(CN)_6] \times 3H2O$; $\beta=150$ g/l) and 1 ml Carrez II ($ZnSO_4 \times 7H_2O$; $\beta=300$ g/l), filled with distilled water and shaken. Then, it was filtered through a soft folded filter (Schleicher & Shuell 595 ½) and 3 ml of the filtrate were diluted with distilled water to attain a total quantity of 25 ml. For the HPLC analysis, it was filtered by a 0.045 µm filter.

| HPLC - conditions | |
|---|---|
| Separating column: | Lichrospher 60 Rp select; B 5 µm; 250 mm × 4 mm |
| Elution solution: | $CH_3CN$/methanol/0.02 M phosphate-buffer pH 4: 7 + 3 + 90 (v/v/v) |
| Velocity of flow: | 0.8-1.4 ml/min |
| Injection volume: | 20 µl |
| Temperature: | Column temperature: 30° C./35° C. isocratic measurement |
| Detection: | 274 nm |
| Pump: | Knauer HPLC pump 64.20 µl-charging valve (loop) |
| Autosampler: | Waters Model 717 Plus |
| Solution degaser: | Degassex DG-4400, Phenomenex |
| Set-up Calibration: | See 4.5 § 35 LMBG - regulation |
| Set-up $PO_4$-buffer solution: | See 4.9 § 35 LMBG - regulation (subsequent filtration by a 0.45 µm filter) |
| Quantification | Peak area |

| LOCATION | THEOBROMINE | CAFFEINE |
|---|---|---|
| Central America | | |
| Dominican Republic | 1.2% | 0.17% |
| Ecuador | 1.44% | 0.29% |
| Haiti | | |

-continued

| LOCATION | THEOBROMINE | CAFFEINE |
|---|---|---|
| Venezuela | | |
| West Africa | | |
| Ivory Coast | 1.19% | 0.13% |
| Ghana | 1.31% | 0.10% |
| Cameroon | 1.46% | 0.06% |
| Nigeria | 1.49% | 0.12% |
| Togo | 1.28% | 0.08% |
| Sierra Leone | 1.27% | 0.07% |
| Southwest Asia | | |
| Indonesia | 1.31% | 0.14% |
| Malaysia | 1.13% | 0.14% |
| Apua New Guinea* | 0.80% | 0.15% |
| Solomon Islands* | 0.90% | 0.06% |

*Sour over-fermented cocoa beans (FF of 375-400)

While the theobromine and caffeine content of cocoa beans vary with the beans origin and fermentation factor, the content does not change markedly during the processing of cocoa solids or chocolate liquor into a final food product. Thus, unlike cocoa procyanidins the percentage of the methylxantines in a final cocoa product can be used to determine the amount of cocoa solids or chocolate liquor used to prepare the final chocolate product. Typically, the theobromine ranges from 1.13% to 1.49% and the caffeine from 0.06 to 0.29%.

The examples which follow are intended as an illustration of certain preferred embodiments of the invention, and no limitation of the invention is implied.

EXAMPLE 1

Method for Preparing High CP Cocoa Solids from Cocoa Beans

Commercially available cocoa beans having an initial moisture content of about 7 to 8% by weight are pre-cleaned in a scalperator. The pre-cleaned bean from the scalperator are further cleaned in an air fluidized bed density separator. The cleaned cocoa beans are then passed through an infra-red heating apparatus at a rate of about 1,701 kilograms per hour. The depth of beans in the vibrating bed of the apparatus is about 2-3 beans deep. The surface temperature of the apparatus is set at about 165° C., thereby producing an internal bean temperature (IBT) of about 135° C. in a time ranging from 1 to 1.5 minutes. This treatment causes the shells to dry rapidly and separate from the cocoa nibs. The broken pieces separated by the vibrating screen prior to the apparatus are re-introduced into the product stream prior to the winnowing step. The resulting beans after micronizing should have a moisture content of about 3.9% by weight. The beans emerge at an IBT of about 135° C. and are immediately cooled to a temperature of about 90° C. in about three minutes to minimize additional moisture loss. The beans are then winnowed to crack the beans to loosen the shells and separate the lighter shells from the nibs while at the same time minimizing the amount of nib lost with the shell reject stream.

The resulting cocoa nibs are pressed using two screw presses to extract the butter from the cocoa solids.

A sample of cocoa solids, produced according to the above-described process from unfermented cocoa beans (fermentation factor 233), when analyzed according to the above-referenced method, typically will have a total cocoa procyanidin content of about 50 to about 75, preferably about 60 to about 75, or more preferably about 75 to about 80 milligrams total cocoa procyanidins per gram of defatted cocoa powder.

EXAMPLE 2

Production of Chocolate Liquor Containing Cocoa Polyphenols

Fair average quality (FAQ) cocoa beans having an initial moisture content of 7.4% by weight and a fermentation factor of 233 (31% slaty, 29% purple, 22% purple brown, and 17% brown) are selected as the starting material. The cocoa beans are then passed through an infra-red heating apparatus. The feed rate of beans through the infra-red heater and the infra-red heater bed angle are varied to control the amount of heat treatment the beans receive. The amount of time the beans spend in the infra-red heater (residence time) is determined by the bed angle and the feed rate. The times that should be used to prepare the sample material are listed in the table below. At the outlet of the micronizer the IBT of the beans is measured. Expected values are also shown in the table.

A 1 kg sample of infra-red heated beans, collected off the infra-red heater at different IBTs, are cracked into smaller pieces to facilitate the separation of the nib from the shell. The cracked beans are then passed through a laboratory scale winnowing system. The cocoa nibs are then crushed and milled into a coarse chocolate liquor. The normal operating temperature for the liquor in the crusher is approximately 50° C. The cocoa nibs are ground for one hour. The expected cocoa polyphenol values are shown below.

TABLE

| IBT ° C. | Residence Time in Micronizer, Seconds | % Moisture in Finished Liquor | mg/g of Total Cocoa Procyanidins in Defatted Cocoa Powder |
|---|---|---|---|
| 107 | 42 | 3.9 | 67.3 |
| 126 | 82 | 1.87 | 48.9 |
| 148 | 156 | 1.15 | 40.7 |

EXAMPLE 3

Chews Containing Sterol Esters in Combination with High CP Cocoa Solids

The chews were prepared from the ingredients shown below by pre-mixing sterol esters, cocoa solids, lecithin, and dark chocolate liquor or milk chocolate liquor, for example in Z-blade mixer, to prepare the pretreated cocoa solids. The pretreated cocoa solids were incorporated into a cooked syrup (heated to 66° C.) containing the remaining ingredients. The moisture content of the syrup was about 9%. The mixture was slowly cooled, rolled, and wrapped. The moisture content of the final mixture was about 8.3-8.7%.

The cocoa solids used to prepare the chews had a cocoa procyanidin content of about 50 to about 80 milligrams per gram of defatted cocoa solids. The canola sterol esters used to prepare the chews were supplied by Raisio Benecol Ltd., Finland or Raisio Staaco U.S., Inc. They had a melting point of about 30° C. and were heated at about 50-60° C. to ensure complete liquification. The phytosterols present in the mixture include B-sitosterol (50.6%), campestoerol (27.6%), stigmasterol (16.8%), and other sterols (5%) esterified using the interesterification process described in U.S. Pat. No. 5,502,045 issued Mar. 26, 1996.

Dark Chocolate Chew

|  | % Formula |
| --- | --- |
| Corn Syrup (63 D.E.) | 27 |
| Sugar (Cane or Beet) | 21 |
| Sweetened Condensed Skim Milk | 15 |
| Dark Liquor | 20 |
| Cocoa Powder (10-12% fat) | 8 |
| Canola Sterol Esters | 6 |
| Solid Vitamin Premix | 2 |
| Vanilla Ice Cream Flavors | 0.75 |
| Soy Lecithin | 0.125 |
| Salt-Flour | 0.125 |

Milk Chocolate Chew

|  | % Formula |
| --- | --- |
| Corn Syrup (63 D.E.) | 27 |
| Sugar - Cane or Beet | 21 |
| Sweetened Condensed Skim Milk | 15 |
| Milk Chocolate Liquor | 12 |
| Water | 8 |
| High CP Cocoa Powder (10-12% fat) | 8 |
| Canola Sterol Esters | 6 |
| Solid Vitamin Premix | 2 |
| Vanilla Ice Cream Flavors | 0.75 |
| Soy Lecithin | 0.125 |
| Salt-Flour | 0.125 |

EXAMPLE 4

Chocolate Granola Bars

A syrup containing all the minor ingredients (i.e., vitamin mixture, brown sugar, salt vanilla) dissolved or dispersed in the corn syrups was prepared by blending the ingredients at about 55° C. for 15 minutes in a high speed mixer. The high CP cocoa solids were mixed with a mixture of the canola sterol esters, chocolate liquor, and lecithin and blended briefly, e.g., for about 15 minutes in a high speed mixer to create the pretreated cocoa solids. The aqueous syrup stream and pretreated cocoa solids streams were mixed at the last possible moment, in an in-line mixer to create binder syrup and then blended with the dry ingredients (i.e., rice, soy, oats, and optional almonds, cherries, and blueberries). The blend was deposited as a slab, compressed, slit into bars, and cooled.

Granola Bars

|  | Formula (%) |
| --- | --- |
| Pretreated Cocoa Solids |  |
| High CP Cocoa Powder* | 8 |
| Canola Sterol Esters* | 7 |
| Chocolate Liquor | 1.5 |
| Soy Lecithin | 0.2 |

Granola Bars

|  | Formula (%) |
| --- | --- |
| Syrup |  |
| Corn Syrup (55 DE) | 17 |
| Corn Syrup (63 DE) | 9 |
| Vitamin Premix | 2.4 |
| Fructose | 1.1 |
| Salt | 0.4 |
| Brown Sugar | 0.3 |
| Vanilla Ice Cream Flavors | 0.1 |
| Water | 9 |
| Dry Ingredients |  |
| Soy Crisp | 11 |
| Crisp Rice | 9 |
| Oats | 6 |
| Enrobing Ingredient |  |
| Chocolate | 18 |

*See description in Example 3

Chocolate almond crunch bars were prepared by adding 5-20%, preferably about 7-14%, chopped almonds to the dry mix. Similarly chocolate blueberry crunch bars and chocolate cherry crunch bars were prepared by adding 4-20%, preferably 6-14% of dried blueberries or cherries to the dry mix.

EXAMPLE 5

Preparation of Binder Syrups

Two binder syrups of identical composition were prepared to compare the effect of pretreating high CP cocoa solids. The formulation is the same as that used in Example 4 except the dry ingredients (soy crisp, crisp rice, and oats) were not used. In the comparative binder syrup, the syrup ingredients as well as the high CP cocoa solids, sterol esters, chocolate liquor, and soy lecithin were all mixed in one step. In the inventive binder, the pretreated high CP cocoa solids were prepared separately, the syrup was prepared separately, and then the two liquids were combined. In both tests all materials were maintained at a temperature between 50 and 60° C.

The average cocoa procyanidin content of binder syrups containing pretreated and untreated cocoa solids was determined using the analytical procedure described above. The results are set out below.

Total Cocoa Procyanidins (mg./g of binder syrup)

| Mixing (minutes) Time | Syrup Prepared with Untreated Cocoa Solids | % Retained Cocoa Procyanidins | Syrup Prepared with Pretreated Cocoa Solids | Retained Cocoa Procyanidins |
| --- | --- | --- | --- | --- |
| 0 | 10 | — | 10 | — |
| 15 | 9.04 | 90% | 10.07 | 100% retained |
| 60 | 6.78 | 68% | 9.87 | 99% |
| 120 | 5.91 | 59% | 9.12 | 90% |
| 180 | 5.75 | 58% | 8.87 | 89% |
| 240 | 5.75 | 58% | 8.86 | 89% |

The results show that when untreated cocoa solids were used, about 10% of the cocoa procyanidins were lost during the first 15 minutes of mixing and that about 32% were lost after only 60 minutes of mixing. The greatest loss (42%) occurred after 3 hours of mixing. The syrup prepared from the pretreated cocoa solids showed no loss until 60 minutes. From at least 89% to 100% of the cocoa procyanidins were retained when pretreated cocoa solids were used to prepare the binder syrup. There were no further losses when the binder syrup prepared with the pretreated cocoa solids was formulated into dark or milk chocolate chews or chocolate granola bars.

Other variations and modifications, which will be obvious to those skilled in the art, are within the scope and teachings of these inventions. The inventions are not to be limited except as set forth in the following claims.

What is claimed is:

1. An additive for a food or a food supplement comprising partially or fully defatted cocoa solids pretreated by mixing with about 9% to about 90% by weight, based on the cocoa solids, of sterol ester(s) and/or stanol ester(s) which are liquids at temperatures of about 80° C. or less, wherein the cocoa solids after pretreatment have a cocoa procyanidin content of at least about 50 to about 75 milligrams per gram of defatted cocoa solids.

2. The additive of claim 1, wherein the cocoa procyanidin content is about 60 to about 75 milligrams per gram of defatted cocoa solids.

3. The additive of claim 1, wherein the cocoa procyanidin content is about 75 to about 80 milligrams per gram of defatted cocoa solids.

4. A process for preparing a binder syrup for a food or a food supplement comprises the step of mixing at about 2° C. to 160° C. (i) a syrup which is an aqueous solution of a nutritive carbohydrate sweetener, a sugar substitute, or a combination of the sweetener and the sugar substitute and (ii) partially or fully defatted cocoa solids pretreated by mixing with about 9% to about 90% by weight, based on the cocoa solids, of sterol ester(s) and/or stanol ester(s) which are liquids at temperatures of about 80° C. or less, wherein the cocoa solids after the pretreatment have a cocoa procyanidin content of at least about 50 to 75 milligrams per gram of defatted cocoa solids.

5. A binder syrup prepared by the process of claim 4.

6. The process of claim 4, wherein the cocoa procyanidin content is about 60 to about 75 milligrams per gram of defatted cocoa solids.

7. The additive of claim 4, wherein the cocoa procyanidin content is about 75 to about 80 milligrams per gram of defatted cocoa solids.

8. The process of claim 4, wherein the nutritive carbohydrate sweetener comprises corn syrup or a blend of corn syrup and another sweetener.

9. The process of claim 8, wherein the other sweetener is sucrose, dextrose, fructose, lactose, maltose, glucose syrup, invert sugar, hydrolyzed lactose, honey, maple sugar, brown sugar, or molasses.

10. The process of claim 4, wherein sugar substitute is a high potency sweetener, a sugar alcohol, or a bulking agent.

11. The process of claim 10, wherein the high potency sweetener is aspartame, a cyclamate, saccharin, acesulfame, neo-hesperidin dihydrochalcone, sucralose, alitame, astevia, glcyrrhizin, and/or thaumatin; wherein the sugar alcohol is sorbitol, mannitol, xylitol, maltitol, isomalt, lactitol; and wherein the bulking agent is polydextrose, cellulose, or its derivatives, malodextrin, or gum arabic.

12. A binder syrup comprising a mixture of (i) a syrup which is an aqueous solution of a nutritive carbohydrate sweetener, a sugar substitute, or a combination of the sweetener and the sugar substitute and (ii) cocoa solids pretreated with about 9% to about 90% by weight of sterol ester(s) and/or stanol ester(s); and wherein the binder syrup is liquid at about 40° C. to about 80° C. and solid at room temperature and wherein the weights are based on the weight of the cocoa solids.

13. A binder syrup comprising a mixture of (i) an aqueous solution of a nutritive carbohydrate sweetener, a sugar substitute, or a combination of the sweetener and the sugar substitute and (ii) cocoa solids pretreated with about 9% to about 90% by weight of sterol ester(s) and/or stanol ester(s) and with about 0.5% to about 5% of a lecithin, with about 0.5% to about 20% of a chocolate liquor, or with a mixture of the lecithin and the chocolate liquor; wherein the binder syrup is liquid at about 40° C. to about 80° C. and solid at room temperature and wherein the weights are based on the weight of the cocoa solids.

14. The binder syrup of claim 13, wherein the lecithin is about 0.05% to about 1% and wherein the chocolate liquor is about 0.05% to about 10%.

15. The binder syrup of claim 13, wherein the lecithin is about 0.25% to about 1% and wherein the chocolate liquor is about 005% to about 3%.

16. The binder syrup of claim 13, wherein the lecithin is derived from a vegetable oil selected from the group consisting of soybean, cottonseed, corn, safflower, and rapeseed oil.

17. The binder syrup of claim 16, wherein the lecithin is soy lecithin.

18. The binder syrup of claim 12 or claim 13, wherein the syrup is about 50% to about 85% and wherein the pretreated cocoa solids are about 15% to about 50%, the percentages being by weight and totaling 100%.

19. The binder syrup of claim 12 or claim 13, wherein the syrup is about 60% to about 80% and the pretreated cocoa solids are about 20% to about 40%, the percentages being by weight and totaling 100%.

20. The binder syrup of claim 12 or claim 13, wherein the syrup is about 65% to about 80% and the pretreated cocoa solids are about 20% to about 35%, the percentages being by weight and totaling 100%.

21. The binder syrup of claim 12 or claim 13, wherein the syrup is about 70% to about 75% and the pretreated cocoa solids are about 25% to about 30%, the percentages being by weight and totaling 100%.

22. The binder syrup of claim 12 or claim 13, further comprising up to 15% of vitamins, minerals, or mixtures thereof, up to 1% of a flavorant, and up to 3% of a salt, the weights being based on the weight of the cocoa solids.

* * * * *